(12) United States Patent
Kramer et al.

(10) Patent No.: US 9,348,880 B1
(45) Date of Patent: May 24, 2016

(54) FEDERATED SEARCH OF MULTIPLE SOURCES WITH CONFLICT RESOLUTION

(71) Applicant: Palantir Technologies, Inc., Palo Alto, CA (US)

(72) Inventors: Danielle Kramer, San Francisco, CA (US); Andrew Israel, Palo Alto, CA (US); Jeffrey Chen, Menlo Park, CA (US); David Cohen, Mountain View, CA (US); Stephen Freiberg, Palo Alto, CA (US); Bryan Offutt, Palo Alto, CA (US); Matthew Avant, Palo Alto, CA (US); Peter Wilczynski, San Francisco, CA (US); Jason Hoch, San Jose, CA (US); Robert Liu, Palo Alto, CA (US); William Waldrep, Palo Alto, CA (US); Kevin Zhang, Palo Alto, CA (US); Alexander Landau, Palo Alto, CA (US); David Tobin, Atherton, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/676,621

(22) Filed: Apr. 1, 2015

(51) Int. Cl.
*G06F 17/30* (2006.01)

(52) U.S. Cl.
CPC .... *G06F 17/30566* (2013.01); *G06F 17/30156* (2013.01); *G06F 17/30581* (2013.01); *G06F 17/30864* (2013.01)

(58) Field of Classification Search
CPC .................................................. G06F 17/30283
See application file for complete search history.

(56) References Cited

U.S. PATENT DOCUMENTS

| | | | |
|---|---|---|---|
| 7,657,540 B1 * | 2/2010 | Bayliss | 707/609 |
| 7,899,796 B1 * | 3/2011 | Borthwick | G06F 17/30489 707/692 |
| 7,900,052 B2 * | 3/2011 | Jonas | 713/179 |
| 2009/0024589 A1 * | 1/2009 | Sood et al. | 707/3 |
| 2011/0258190 A1 * | 10/2011 | Chen et al. | 707/737 |
| 2014/0330845 A1 * | 11/2014 | Feldschuh | 707/749 |

* cited by examiner

*Primary Examiner* — Khanh Pham
(74) *Attorney, Agent, or Firm* — Hickman Palermo Becker Bingham LLP; C. James Oh

(57) ABSTRACT

Methods and apparatuses related to federated search of multiple sources with conflict resolution are disclosed. A method may comprise obtaining a set of data ontologies (e.g., types, properties, and links) associated with a plurality of heterogeneous data sources; receiving a selection of a graph comprising a plurality of graph nodes connected by one or more graph edges; and transforming the graph into one or more search queries across the plurality of heterogeneous data sources. A method may comprise obtaining a first data object as a result of executing a first search query across a plurality of heterogeneous data sources; resolving, based on one or more resolution rules, at least the first data object with a repository data object; deduplicating data associated with at least the first data object and the repository data object prior to storing the deduplicated data in a repository that has a particular data model.

10 Claims, 11 Drawing Sheets

FIG. 5

TABLE 500

RESOLUTION RULES 502

| | DATA SOURCE UNIQUE IDENTIFIER 504 | REPOSITORY UNIQUE IDENTIFIER 506 | UNIQUE DATA OBJECT PROPERTY TYPE 508 | ASSOCIATED DATA 516 | DEDUPLICATED DATA 518 |
|---|---|---|---|---|---|
| FIRST DATA OBJECT 510 | 8.11.5 | NULL | SSN = 123-45-6789 | DSUID = 8.11.5<br>SSN = 123-45-6789<br>DOB = 2/29/92 | DSUID 1 = 15.3.7<br>DSUID 2 = 8.11.5<br>RUID = A7$2%K&P8<br>SSN = 123-45-6789<br>DOB = 2/29/92 |
| ANOTHER DATA OBJECT 512 | 15.3.7 | A7$2%K&P8 | SSN = 123-45-6789 | DSUID = 15.3.7<br>RUID = A7$2%K&P8<br>SSN = 123-45-6789 | |
| MATCH 514 | NO | NO | YES | | |

(12)  United States Patent US 9,348,880 B1

FEDERATED SEARCH OF MULTIPLE SOURCES WITH CONFLICT RESOLUTION

FIELD OF THE DISCLOSURE

Embodiments relate to information retrieval technology and, more specifically, to federated search of multiple sources with conflict resolution.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A user may wish to search for information related to an item of interest. However, the user may be unable to decide which data source to search. The user may also be unfamiliar with a query language used for retrieving information from a data source. Additionally, the user may be unsatisfied by search results from any single data source. Thus, the user may become frustrated by the time consumed in performing multiples searches in multiple data sources. Worse yet, the user may give up and the information may remain unknown to the user.

However, a federated search of multiple data sources may return incompatible data. Different data sources may employ different data models. Different data sources may store different versions of the same data. Different data sources may have different permission levels.

BRIEF DESCRIPTION OF THE DRAWINGS

In the drawings:

FIG. 5 is a table that depicts an approach for resolving data objects and deduplicating data associated with the data objects.

Figure 1:
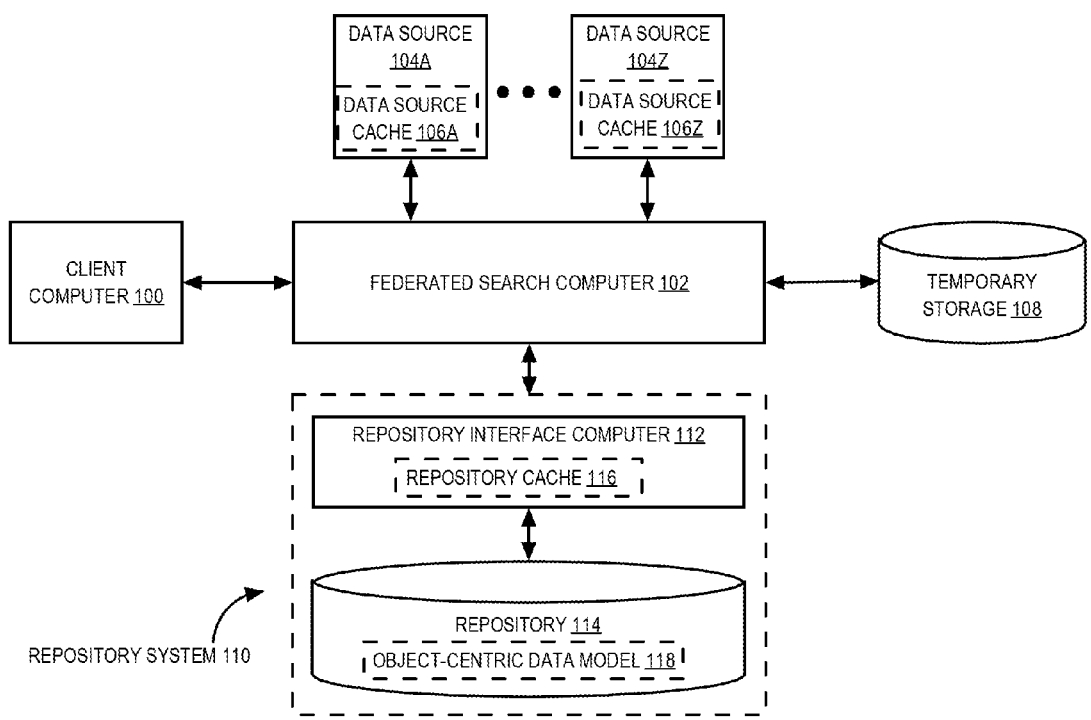
FIG. 1 depicts an example client-server computer architecture on which embodiments may be implemented.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments. Modifiers such as "first", "second", and "third" may be used to differentiate elements, but the modifiers do not necessarily indicate any particular order. For example, "second search query" may be so named to differentiate it from "first search query", but "second search query" may refer to a second search query and/or a third search query. Furthermore, a grouping of similar items may be collectively referenced as a single item for clarity and ease of reference. For example, a grouping of "first data object" and "second data object" may be collectively referenced as "first data object". For clarity and ease of reference, an original and a copy may both be referenced by the name of the original. For example, "deduplicated data" and "copy of the deduplicated data" may both be referenced as "deduplicated data".

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to "a computer" herein may mean one or more computers, unless expressly stated otherwise.

While some of the aforementioned elements are depicted in the figures and described herein as if implemented on a separate, remote computer from each other, this is done for explanation purposes only and one or more of the elements may be part of and/or executed on the same computer. Each of the logical and/or functional units depicted in the figures or described herein may be implemented using any of the techniques further described herein in connection with FIG. 11. For example, a computer may comprise a general-purpose computer configured with one or more stored programs which when executed cause performing the functions described herein for one or more logical and/or functional units; a special-purpose computer with digital logic that is configured to execute the functions; or digital logic that is used in other computing devices. While the figures include lines that indicate various devices and/or modules being communicatively coupled, each of the computers, devices, modules, storage, and logic may be communicatively coupled with each other.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

Methods and computer apparatuses related to federated search of multiple sources with conflict resolution are disclosed. A client computer may send a search query to a federated search computer. The search query may be represented in a graphical format, such as graph nodes connected by graph edges, histograms of selectable categories, etc. Additionally or alternatively, the search query may be represented via text in a syntax that describes one of these graphical formats. The search query may be executed across heterogeneous data sources, such as databases and/or repository systems that use different data models for modeling data. The results of the search query may be grouped based on similarities, such as common unique identifiers. The federated search computer may send the results to the client computer in a graphical and/or tabular format. The results may be filtered based on permissions associated with the results, the client computer, a third-party authentication service, and/or a user of the client computer.

The client computer may send, to the federated search computer, a request to store the results in a repository system. The federated search computer may enrich (e.g., supplement) the results with data obtained from one or more additional search queries in one or more of the heterogeneous data sources. The federated search computer may send the results to the repository system. The repository system may deduplicate the results and store the deduplicated results. For example, the repository system may eliminate any information that appears more than once in the results. Additionally or alternatively, the repository system may infer that different results represent the same information. The repository system may send a unique identifier for the deduplicated results to the federated search computer. The federated search computer may send the unique identifier to the client computer. Thus, the user may perform any action with the deduplicated results by referencing the unique identifier.

A change to data in one of the heterogeneous data sources may be imported automatically to the federated search computer. For example, the federated search computer may subscribe to a data feed that automatically provides the federated search computer with changes to data. Additionally or alternatively, the change to data may be inferred by the federated search computer. For example, the federated search computer may infer a change to data in one of the heterogeneous data sources by comparing the results of a current search to cached data. The change to data may be synchronized with a change to data in the repository system. For example, if the data in the repository is deemed outdated based on a ranking of data sources and/or repositories, the repository may be updated with the change to the data.

1.0 GENERAL OVERVIEW

In an embodiment, a method comprises obtaining a set of data ontologies associated with a plurality of heterogeneous data sources. For example, the set of data ontologies may be obtained by processing the data ontology that is output by each of the plurality of heterogeneous data sources. The method may also comprise receiving a selection by a user of a graph comprising a plurality of graph nodes connected by one or more graph edges. A graph node may represent a data object type or a data object property that is described in at least one data ontology of the set of data ontologies. A graph edge may represent a data object link that is described in at least one data ontology of the set of data ontologies. Additionally, the method may comprise transforming the graph into one or more search queries across the plurality of heterogeneous data sources. For example, transforming the graph into a search query may involve converting the graph into a data structure than may easily be converted into query language.

One of the plurality of graph nodes may represent a first data object and a second data object that are resolved based on one or more resolution rules. For example, the first data object and the second data object may be resolved by grouping them together based on similarities. The one or more resolution rules may comprise resolving at least the first data object with the second data object when the first data object and the second data object share a unique identifier that references the first data object and the second data object in one or more data sources of the plurality of heterogeneous data sources. For example, a resolution rule may resolve the first data object with the second data object because they share the same primary key in the same database. Additionally or alternatively, the one or more resolution rules may comprise resolving at least the first data object with the second data object when the first data object and the second data object share one or more data object properties that are specified by the one or more resolution rules and that uniquely identify the first data object and the second data object. For example, the one or more resolution rules may specify that the first data object is resolved with the second data object if the first data object and the second data object share the same Vehicle Identification Number. The one or more resolution rules may also consider data object properties that are derived from combining multiple data object properties. For example, the first data object may be resolved with the second data object if the first data object and the second data object share identical last names and are associated with heights that differ by less than 2 inches.

The transforming the graph into one or more search queries across the plurality of heterogeneous data sources may comprise transforming the graph into a serializable hierarchy of elements that correspond to the plurality of graph nodes and the one or more graph edges. The serializable hierarchy of elements may be easily converted into query language by performing serialization.

The graph may also be transformed to display one or more results of the one or more search queries. For example, a search query represented by a pair of graph nodes connected by a graph edge may be transformed into a single graph node that represents the result of the search query.

The one or more results of the one or more search queries may be filtered based on one or more access control identifiers associated with one or more groups of users and one or more permissions. For example, a particular result may be tagged with an access control identifier that indicates only people with top secret clearance may access and/or modify the particular result.

In an embodiment, a method may comprise obtaining a first data object as a result of executing a first search query across a plurality of heterogeneous data sources. For example, the first search query may return a person named Mary with green eyes. The method may also comprise resolving, based on one or more resolution rules, at least the first data object with a repository data object. For example, Mary's name and eye color may be grouped together with the data for Mary in the repository. Additionally, the method may comprise deduplicating data associated with at least the first data object and the repository data object prior to storing the deduplicated data in a repository that has a particular data model. For example, the data for Mary may now include her name twice, so the repetition of her name may be deleted. However, the resulting name may continue to contain references to both data sources to preserve data provenance.

The first search query may be transformed from a plurality of histograms of selectable categories. For example, a pair of histograms may be converted into a serializable hierarchy of elements, and the serializable hierarchy of elements may be converted into query language.

The plurality of heterogeneous data sources may comprise one or more caches associated with one or more other repositories. For example, a search query may be executed in a repository cache in the same manner in which it is executed in one of the plurality of heterogeneous data sources.

The particular data model may comprise an object-centric data model. For example, the one or more results of the first search query may comprise a first data object containing one or more data object properties.

The resolving, based on one or more resolution rules, at least the first data object with a repository data object may comprise: generating the repository data object; generating a unique identifier based on one or more data object properties that uniquely identify the first data object; and storing the unique identifier in the repository in a manner such that the unique identifier references the repository data object. The repository data object may comprise a stub data object. For example, the stub data object may be generated to allow a prior version of the first data object to be resolved with a change to the first data object that has yet to be persisted in the repository.

The one or more resolution rules may comprise grouping at least the first data object with another data object that shares a unique identifier that references the another data object in one or more data sources of the plurality of heterogeneous data sources. Additionally or alternatively, the one or more resolution rules may comprise grouping at least the first data object with another data object that shares a unique identifier that references the another data object in the repository. Additionally or alternatively, the one or more resolution rules may comprise grouping at least the first data object with another data object that shares one or more data object properties that uniquely identify the another data object.

Prior to resolving at least the first data object with the repository data object, at least the first data object may be resolved, based on the one or more resolution rules, with a second data object that is obtained from a second search query in one or more data sources of the plurality of heterogeneous data sources. The second search query may take as input one or more results of at least the first search query.

A change to data in one of the plurality of heterogeneous data sources may be automatically imported based on a push or pull technology. The change to data in one of the plurality of heterogeneous data sources and a change to data in the repository may be synchronized based on vector clocks, repository rankings, and/or data source rankings.

2.0 EXAMPLE FEDERATED SEARCH SYSTEM

FIG. 1 depicts an example client-server computer architecture on which embodiments may be implemented. In the example of FIG. 1, client computer 100 is communicatively coupled to a federated search system comprising federated search computer 102, a plurality of heterogeneous data sources 104A-Z, a plurality of data source caches 106A-Z, temporary storage 108, repository system 110, repository interface computer 112, repository 114, repository cache 116, and object-centric data model 118.

2.1 Search API

Client computer 100 may be a desktop computer, a laptop computer, a smartphone, a tablet computer, a smart television, and/or any other networked computer that acts as a client. Client computer 100 may comprise a user interface, such as a graphical user interface, through which a user may enter commands and/or interact with data. The user may send, through client computer 100 and/or the user interface, a search query to federated search computer 102. The search query may be written in Structured Query Language (SQL), Not Only SQL (NoSQL), XQuery, Lightweight Directory Access Protocol (LDAP), and/or any other language or protocol that retrieves information from a data source. The search query may comprise a Boolean expression. The search query may have one or more data object filters, one or more data object property filters, a time interval, and/or one or more geolocation queries. For example, the search query may comprise one or more drop-down lists with selectable data objects and/or data object properties.

A particular search application programming interface (API) may be used to execute the search query across a plurality of heterogeneous data sources 104A-Z (e.g., multiple data sources with different data models). The particular search API may be uniform across the plurality of heterogeneous data sources 104A-Z and/or a plurality of client computers. For example, the particular search API may associate the search query with a set of Uniform Resource Identifiers (URIs). The set of URIs may correspond to the plurality of heterogeneous data sources 104A-Z across which the search query is executed.

Additionally or alternatively, the search query may be transformed from a graphical representation of the search query. In an embodiment, the graphical representation may comprise a plurality of graph nodes connected by one or more graph edges; a plurality of histograms of selectable categories; and/or any other format that depicts one or more relationships between one or more data object types (e.g., person, place, organization) and/or data object properties (e.g., height, weight, date of birth). The graphical representation may be transformed into the search query in client computer 100 and/or federated search computer 102.

2.2 Data Source API

Federated search computer 102 may comprise one or more server computers and/or one or more load balancers. Federated search computer 102 may comprise a networked computer that acts as a server to one or more clients, such as client computer 100. Federated search computer 102 may receive requests for data and may respond with data. Federated search computer 102 may be owned and/or managed by one or more independent entities and may span across one or more computer networks, such as the Internet. Additionally or alternatively, federated search computer 102 may respond with data that references data in federated search computer 102 and/or another computer.

Federated search computer 102 may execute the search query across the plurality of heterogeneous data sources 104A-Z. A particular data source API may be used to execute the search query across the plurality of heterogeneous data sources 104A-Z. The particular data source API may be uniform across the plurality of heterogeneous data sources 104A-Z. The particular data source API may be used to translate between federated search computer 102 and the plurality of heterogeneous data sources 104A-Z. For example, the particular data source API may transform the search query into a format that is compatible with one or more data sources of the plurality of heterogeneous data sources 104A-Z. Additionally or alternatively, the particular data source API may transform one or more results of the search query into a particular data model that is compatible with federated search computer 102 and/or repository system 110.

The particular data model may comprise an object-centric data model, such as object-centric data model 118 described below. For example, the one or more results of the search query may comprise one or more data objects. The one or more results of the search query may be in a tabular and/or graphical format, such as a data object graph.

2.3 Provenance Identifiers

One or more data sources of the plurality of heterogeneous data sources 104A-Z may comprise a database, a file, a search engine, a repository, a repository cache, and/or any other system and/or data structure that stores data. Additionally or alternatively, one or more data sources of the plurality of heterogeneous data sources 104A-Z may be a data structure stored in memory on one or more computers. Additionally or alternatively, one or more data sources of the plurality of heterogeneous data sources 104A-Z may be a data structure stored in shared memory between one or more computers. Additionally or alternatively, one or more data sources of the plurality of heterogeneous data sources 104A-Z may be, at least in part, non-volatile storage.

One or more data sources of the plurality of heterogeneous data sources 104A-Z may send the one or more results of the search query to federated search computer 102. A copy of the one or more results of the search query may be stored in one or more data source caches of a plurality of data source caches 106A-Z. One or more data source caches of the plurality of data source caches 106A-Z may store one or more results of any search query. The plurality of data source caches 106A-Z may be located in the plurality of heterogeneous data sources 104A-Z and/or server computers deployed with the plurality of heterogeneous data sources 104A-Z. One or more data source caches of the plurality of data source caches 106A-Z may be a file, a system, and/or a data structure that stores data. Additionally or alternatively, one or more data source caches of the plurality of data source caches 106A-Z may be a data structure stored in memory on one or more computers comprising, at least in part, a server computer deployed with one or more data sources of the plurality of heterogeneous data sources 104A-Z. Additionally or alternatively, one or more data source caches of the plurality of data source caches 106A-Z may, at least in part, be a data structure stored in shared memory between one or more computers. Additionally or alternatively, one or more data source caches of the plurality of data source caches 106A-Z may be, at least in part, non-volatile storage.

The plurality of heterogeneous data sources 104A-Z and/or federated search computer 102 may generate and/or assign one or more provenance identifiers to the one or more results of the search query. As used herein, a "provenance identifier" refers to metadata that describes data relative to one or more sources of the data. The one or more provenance identifiers may be temporary, unique, uniform across the plurality of heterogeneous data sources 104A-Z, and/or associated with one or more provenances of the one or more results of the search query. For example, the one or more provenance identifiers may comprise one or more data source system identifiers (e.g., a unique identifier for each of the plurality of heterogeneous data sources 104A-Z), one or more data source object identifiers (e.g., a locally unique identifier for a data object in each of the plurality of heterogeneous data sources 104A-Z), and/or one or more data source system version numbers (e.g., a version number of each of the plurality of heterogeneous data sources 104A-Z). Additionally or alternatively, the plurality of heterogeneous data sources 104A-Z and/or federated search computer 102 may maintain a mapping between the one or more provenance identifiers and the one or more results of the search query. A provenance identifier may be assigned to each data object and/or each data object graph in the one or more results of the search query.

Temporary storage 108 may be a database, a configuration file, and/or any other system and/or data structure that stores data. Temporary storage 108 may be on a separate device from federated search computer 102. Additionally or alternatively, temporary storage 108 may be a data structure stored in memory on one or more computers comprising, at least in part, federated search computer 102. Additionally or alternatively, temporary storage 108 may, at least in part, be a data structure stored in shared memory between one or more computers. Additionally or alternatively, temporary storage 108 may be, at least in part, non-volatile storage. Temporary storage 108 may store the one or more provenance identifiers and/or a copy of the one or more results of the search query. Additionally or alternatively, temporary storage 108 may maintain a mapping between the one or more provenance identifiers and the one or more results of the search query.

2.4 Persist Request

Federated search computer 102 may send the one or more results of the search query to client computer 100. Federated search computer 102 may filter the one or more results of the search query prior to sending the one or more results to client computer 100. Federated search computer 102 may filter the one or more results of the search query based on a load level specified by client computer 100. For example, client computer 100 may specify a load level that indicates the number and/or types of data object links; the number and/or types of data object properties; and/or the number and/or types of media (e.g., pictures, video, audio) to be sent to client computer 100. Additionally or alternatively, federated search computer 102 may filter the one or more results of the search query based on one or more access control identifiers associated with one or more groups of users and one or more permissions. Prior to sending the one or more results to client computer 100, federated search computer 102 may optionally resolve (e.g., place in a group of similar things) the one or more results based on one or more similarities. For example, two data objects in the one or more results may represent two different people but may be grouped together based on a shared data object property, such as the same name.

When the user interacts with the one or more results, client computer 100 and/or the user interface may send a persist request to federated search computer 102. As used herein, a "persist request" refers to a request to store data. The persist request may be a request to store, in repository system 110, the one or more results and/or one or more provenance identifiers associated with the one or more results. For example, the persist request may be a request to store a provenance identifier associated with a first data object in the one or more results. If the one or more results were filtered prior to being sent to client computer 100, federated search computer 102 may retrieve the copy of the one or more results stored in an unfiltered state in one or more data source caches of the plurality of data source caches 106A-Z and/or temporary storage 108. If the copy of the one or more results is non-existent in the one or more data source caches of the plurality of data source caches 106A-Z and/or temporary storage 108, the search query may be executed again.

2.5 Internal Resolution

Based on the one or more provenance identifiers, federated search computer 102 may determine which of the plurality of heterogeneous data sources 104A-Z returned the one or more results. For example, federated search computer 102 may determine, based on the data source system identifier and/or the data source system version number of the provenance identifier associated with the first data object, that the first data object was obtained from data source 104A. Federated search computer 102 may execute a second search query in one or more data sources of the plurality of heterogeneous data sources 104A-Z that returned the one or more results of the search query (i.e., a first search query). The second search query may take as input the one or more results of the first search query. For example, federated search computer 102 may execute a second search query in data source 104A that takes as input the first data object.

Federated search computer 102 may resolve, based on one or more local resolution rules comprising matching data source object identifiers and/or matching unique data object properties, one or more results of the second search query with the one or more results of the first search query. Resolving the one or more results of the second search query with the one or more results of the first search query may comprise performing a first union of matching results from the first search query and the second search query. For example, the second search query may obtain a second data object that is grouped with the first data object based on a unique identifier (e.g., a primary key, a unique index) that references the first data object and the second data object in the one or more data sources of the plurality of heterogeneous data sources 104A-Z that returned the one or more results of the first search query and/or based on one or more data object properties that uniquely identify the first data object and the second data object.

2.6 Enrichment

Optionally, federated search computer 102 may execute a third search query that takes as input the first union of matching results. The third search query may be executed in one or more data sources of the plurality of heterogeneous data sources 104A-Z that is/are related to the one or more data sources of the plurality of heterogeneous data sources 104A-Z that returned the one or more results of the first search query. For example, federated search computer 102 may execute a third search query in data source 104Z that takes as input the first data object and the second data object. Federated search computer 102 may determine, based on a set of data ontologies, a relationship between one or more data sources of the plurality of heterogeneous data sources 104A-Z and the one or more data sources of the plurality of heterogeneous data sources 104A-Z that returned the one or more results of the first search query. The set of data ontologies may describe the structure of data in the plurality of heterogeneous data sources 104A-Z. For example, the set of data ontologies may indicate data object types, data object property types, and/or data object link (e.g., a relationship between one or more data objects and/or data object properties) types available in one or more data sources of the plurality of heterogeneous data sources 104A-Z.

Federated search computer 102 may resolve, based on the one or more local resolution rules, one or more results of the third search query with the first union of matching results. Resolving the one or more results of the third search query with the first union of matching results may comprise performing a second union of matching results from the third search query and the first union of matching results. For example, the third search query may obtain a third data object that is grouped with the first data object and the second data object based on a unique identifier that references the third data object as well as the first data object and/or the second data object in one or more data sources of the plurality of heterogeneous data sources 104A-Z and/or based on one or more data object properties that uniquely identify the third data object as well as the first data object and/or the second data object.

2.7 Global Resolution

Federated search computer 102 may send the first union of matching results and/or the second union of matching results to repository system 110. Repository system 110 may comprise repository interface computer 112 and/or repository 114. Repository interface computer 112 may comprise one or more computers that act as a server to federated search computer 102. Repository interface computer 112 may serve as a gateway to repository 114. Repository 114 may be a database, a file, and/or any other system and/or data structure that stores data. Repository 114 may be on a separate device from repository interface computer 112. Additionally or alternatively, repository 114 may be a data structure stored in memory on the one or more computers comprising, at least in part, repository interface computer 112. Additionally or alternatively, repository 114 may, at least in part, be a data structure stored in shared memory between one or more computers. Additionally or alternatively, repository 114 may be, at least in part, non-volatile storage.

Repository interface computer 112 may comprise repository cache 116. Repository cache 116 may be a database, a file, and/or any other system and/or data structure that stores data. Repository cache 116 may be on a separate device from repository interface computer 112. Additionally or alternatively, repository cache 116 may be a data structure stored in memory on the one or more computers comprising, at least in part, repository interface computer 112. Additionally or alternatively, repository cache 116 may, at least in part, be a data structure stored in shared memory between one or more computers. Additionally or alternatively, repository cache 116 may be, at least in part, non-volatile storage.

Repository 114 may have a particular data model. The particular data model may be the same for repository 114 and federated search computer 102. The particular data model may comprise object-centric data model 118. Object-centric data model 118 may be a conceptual structure that is independent of any particular database data model. For example, a data object may correspond to one or more rows in a relational database and/or an entry in a LDAP database. A data object may be a container for information that represents an entity, such as a person, a place, an organization, an event, a document, and/or any other noun. A data object may be associated with a data object type (e.g., Person, Event, Document) and a display name which may be the value of a data object property. A data object may have one or more data object properties, such as name, eye color, and/or any other attribute of the data object. A data object property may have a type (e.g., name) and a value (e.g., "Alice"). A data object may have more than one data object property of the same type. A data object link may connect one or more data objects, one or more data object types, one or more data object properties, and/or one or more data object property types. A data object link may represent a symmetrical (e.g., Kin Of) and/or asymmetrical (e.g., Child Of) relationship.

Repository system 110 and/or repository interface computer 112 may resolve, based on one or more global resolution rules, the first union of matching results with data stored in repository 114. Additionally or alternatively, repository system 110 and/or repository interface computer 112 may resolve, based on the one or more global resolution rules, the second union of matching results with data stored in repository 114. Resolving the data stored in repository 114 with the first union of matching results and/or the second union of matching results may comprise performing a third union of matching results from the data stored in repository 114. The third union of matching results may comprise a repository identifier. The repository identifier may be a unique identifier that is generated based on one or more data object properties that uniquely identify the first union of matching results and/or the second union of matching results.

The one or more global resolution rules may comprise matching repository identifiers, matching provenance identifiers, and/or matching unique data object properties. For example, a repository data object may be grouped with the first data object, the second data object, and/or the third data object based on a unique identifier that references the repository data object as well as the first data object, the second data object, and/or the third data object in one or more data sources of the plurality of heterogeneous data sources 104A-Z; a unique identifier that references the repository data object as well as the first data object, the second data object, and/or the third data object in repository 114; and/or one or more data object properties that uniquely identify the repository data object as well as the first data object, the second data object, and/or the third data object.

In an embodiment, resolving the first union of matching results and/or the second union of matching results with data stored in repository 114 may be impracticable based on the global resolution rules, because the repository data object is non-existent. When the repository data object is non-existent, repository system 110 and/or repository interface computer 112 may generate data that is stored in repository 114 and that is resolved, based on the global resolution rules, with the first union of matching results and/or the second union of matching results. The generated data may comprise a repository identifier. The generated data may consist of a repository identifier. The repository identifier may be hashed and/or stored in repository 114 in a manner such that the repository identifier references the generated data.

For example, when the repository data object is nonexistent in repository 114, repository system 110 and/or repository interface computer 112 may generate the repository data object. The repository data object may be a stub data object. Repository system 110 and/or repository interface computer 112 may generate a repository identifier based on one or more data object properties that uniquely identify the first data object, the second data object, and/or the third data object. Repository system 110 and/or repository interface computer 112 may store the repository identifier in repository 114 in a manner such that the repository identifier references the repository data object and/or the stub data object. Repository system 110 and/or repository interface computer 112 may resolve, based on the one or more global resolution rules, the repository data object and/or the stub data object with the first data object, the second data object, and/or the third data object.

2.8 Deduplication

Repository system 110 and/or repository interface computer 112 may deduplicate the third union of matching results. For example, repository system 110 and/or repository interface computer 112 may deduplicate data associated with the repository data object as well as the first data object, the second data object, and/or the third data object. Deduplication may comprise discarding data that appears in repository 114 as well as in the third union of matching results. Deduplication may also comprise discarding data that appears more than once in the third union of matching results. Additionally, deduplication may comprise discarding a subset of the third union of matching results that is determined to be inconsistent data based on result rankings. The result rankings may establish a hierarchy of results, search queries, and/or data sources. For example, the first data object may be determined to be a primary data object, and data that conflicts with the data object properties of the primary data object may be discarded.

Repository system 110 and/or repository interface computer 112 may store a copy of the deduplicated third union of matching results in repository cache 116. Repository system 110 and/or repository interface computer 112 may send the deduplicated third union of matching results to repository 114. Repository system 110 and/or repository 114 may store the deduplicated third union of matching results in repository 114. Storing the deduplicated third union of matching results may comprise inserting, updating, and/or deleting data in repository 114. Repository system 110 and/or repository interface computer 112 may send the repository identifier and/or the deduplicated third union of matching results to federated search computer 102. Federated search computer 102 may send the repository identifier and/or the deduplicated third union of matching results to client computer 100. Repository system 110 may communicate with other repository systems and/or other federated search systems to share data in repository system 110.

2.9 Data Synchronization

When a change is made to data in one or more data sources of the plurality of heterogeneous data sources 104A-Z and/or repository system 110, federated search computer 102 may automatically import the change based on a push or pull technology. For example, federated search computer 102 may be subscribed to a data feed that provides federated search computer 102 with the change. Additionally or alternatively, the change may be inferred by federated search computer 102. For example, federated search computer 102 may periodically re-execute the first search query, the second search query, and/or the third search query in one or more data sources of the plurality of heterogeneous data sources 104A-Z and compare the one or more results of the first search query, the second search query, and/or the third search query to a previous copy of the one or more results of the first search query, the second search query, and/or the third search query that is stored in the plurality of data source caches 106A-Z. Federated search computer 102 may also search repository cache 116 for changes. The change may be detected based on a difference between hashed values and/or any other similarity metric for detecting changes. The change may be imported to federated search computer 102.

Metadata may be generated and stored in the plurality of data source caches 106A-Z with the one or more results of the first search query, the second search query, and/or the third search query. Metadata may also be generated and stored in repository cache 116. The metadata may comprise vector clocks, timestamps, and/or resolution information associated with the one or more results of the first search query, the second search query, and/or the third search query. Customized rules may use the metadata to resolve conflicts and/or eliminate inconsistency between/among the plurality of heterogeneous data sources 104A-Z and/or repository systems.

Vector clocks may be assigned to the one or more results of the first search query, the second search query, and/or the third search query. For example, vector clocks may be assigned to the first data object, the second data object, the third data object, the repository data object, the first union of matching results, the second union of matching results, and/or the third union of matching results. Vector clocks may be updated when any union of results changes and/or when the repository data object changes.

Federated search computer 102 may infer a change in a vector clock based on the change to data. For example, federated search computer 102 may detect a change to a data object in repository system 110 by comparing entries in repository cache 116. Repository system 110 may have communicated with another repository system and received an update with the change to the data object. Federated search computer 102 may infer, based on the change to the data object in repository system 110, a change in a vector clock assigned to the data object in repository system 110.

Federated search computer 102 may deconflict the change in the vector clock based on repository rankings and/or data source rankings. For example, the change in the vector clock assigned to the data object in repository system 110 may conflict with a vector clock assigned to a related data object in data source 104A. The change in the vector clock assigned to the data object in repository system 110 may be resolved with the vector clock assigned to the related data object in data source 104A based on rankings associated with repository system 110 and data source 104A. The rankings may indicate that data source 104A is more authoritative than repository system 110 and/or data source 104Z indicated by a provenance identifier associated with the data object. The data object in repository system 110 may then be restored to a previous state. Thus, data synchronization may be maintained between data in the plurality of heterogeneous data sources 104A-Z and data in the repository system 110.

Federated search computer 102 may deconflict the change in the vector clock based on a customized deconfliction logic. For example, a conflict between vector clocks assigned to a data object in repository system 110 may be resolved differently depending on the one or more data sources of the plurality of heterogeneous data sources 104A-Z in which the data object originated.

3.0 EXAMPLE FEDERATED SEARCH COMPUTER

Figure 2:
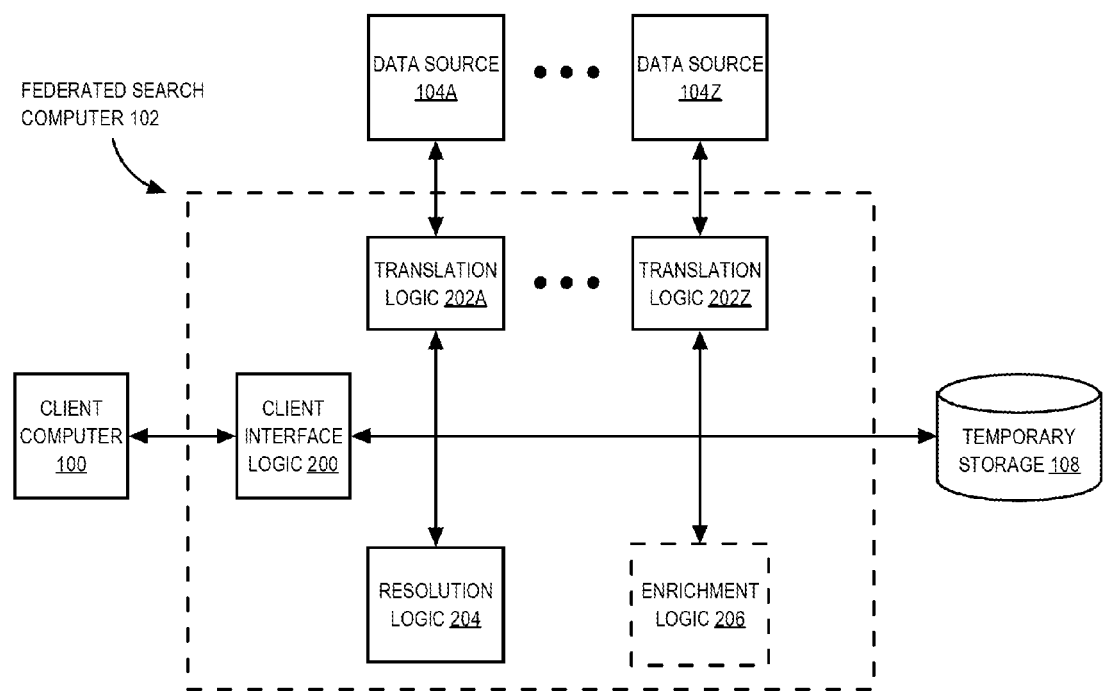
FIG. 2 depicts a detailed view of a federated search computer, in an example embodiment.

FIG. 2 depicts a detailed view of a federated search computer, in an example embodiment. In the example of FIG. 2, federated search computer 102 comprises client interface logic 200, a plurality of translation logics 202A-Z, resolution logic 204, and enrichment logic 206.

Client interface logic 200 may process the first search query, the persist request, and/or any other instructions sent from client computer 100. Client interface logic 200 may forward the first search query to one or more translation logics of the plurality of translation logics 202A-Z. Client interface logic 200 may forward the persist request to resolution logic 204. Client interface logic 200 may send the one or more results of the first search query, the second search query, and/or the third search query to client computer 100. Client interface logic 200 may retrieve the one or more results of the first search query from temporary storage 108. Client interface logic 200 may filter the one or more results of the first search query prior to sending the one or more results to client computer 100.

One or more translation logics of the plurality of translation logics 202A-Z may comprise a plugin, a wrapper, and/or any other set of instructions that translates an existing interface into a compatible interface. One or more translation logics of the plurality of translation logics 202A-Z may translate the first search query into a format that compatible with one or more data sources of the plurality of heterogeneous data sources 104A-Z. One or more translation logics of the plurality of translation logics 202A-Z may translate the one or more results of the first search query, the second search query, and/or the third search query into the particular data model of federated search computer 102 and/or repository system 110. One or more translation logics of a plurality of translation logics 202A-Z may provide federated search computer 102 and/or client interface logic 200 with the set of data ontologies for the plurality of heterogeneous data sources 104A-Z.

One or more translation logics of the plurality of translation logics 202A-Z may generate and/or assign one or more provenance identifiers to the one or more results of the first search query, the second search query, and/or the third search query. One or more translation logics of the plurality of translation logics 202A-Z may assign one or more access control identifiers to the one or more results of the first search query, the second search query, and/or the third search query. An access control identifier may be a tuple comprising a user group and a permission for the user group. One or more translation logics of the plurality of translation logics 202A-Z may transform the one or more results of the first search query, the second search query, and/or the third search query into a graphical representation. One or more translation logics of the plurality of translation logics 202A-Z may send the one or more results of the first query and/or a graphical representation of the one or more results of the first query to temporary storage 108. One or more translation logics of the plurality of translation logics 202A-Z may send the one or more results of the second query and/or a graphical representation of the one or more results of the second query to enrichment logic 206 and/or repository system 110. One or more translation logics of the plurality of translation logics 202A-Z may send the one or more results of the third query and/or a graphical representation of the one or more results of the third query to repository system 110.

Resolution logic 204 may process the persist request from client interface logic 200. Resolution logic 204 may retrieve the one or more results of the first search query from temporary storage 108 and/or one or more data source caches of the plurality of data source caches 106A-Z. Resolution logic 204 may perform internal resolution, such as the internal resolution described in Section 2.5 herein. Resolution logic 204 may send the first union of matching results from the first search query and the second search query to enrichment logic 206 and/or repository system 110.

Optional enrichment logic 206 may process the first union of matching results from the first search query and the second search query from resolution logic 204. Enrichment logic 206 may perform enrichment, such as the enrichment described in Section 2.6 herein. Enrichment logic 206 may send the second union of matching results from the third search query and the first union of matching results to repository system 110.

4.0 VISUAL FEDERATED SEARCH QUERIES

Figure 3:
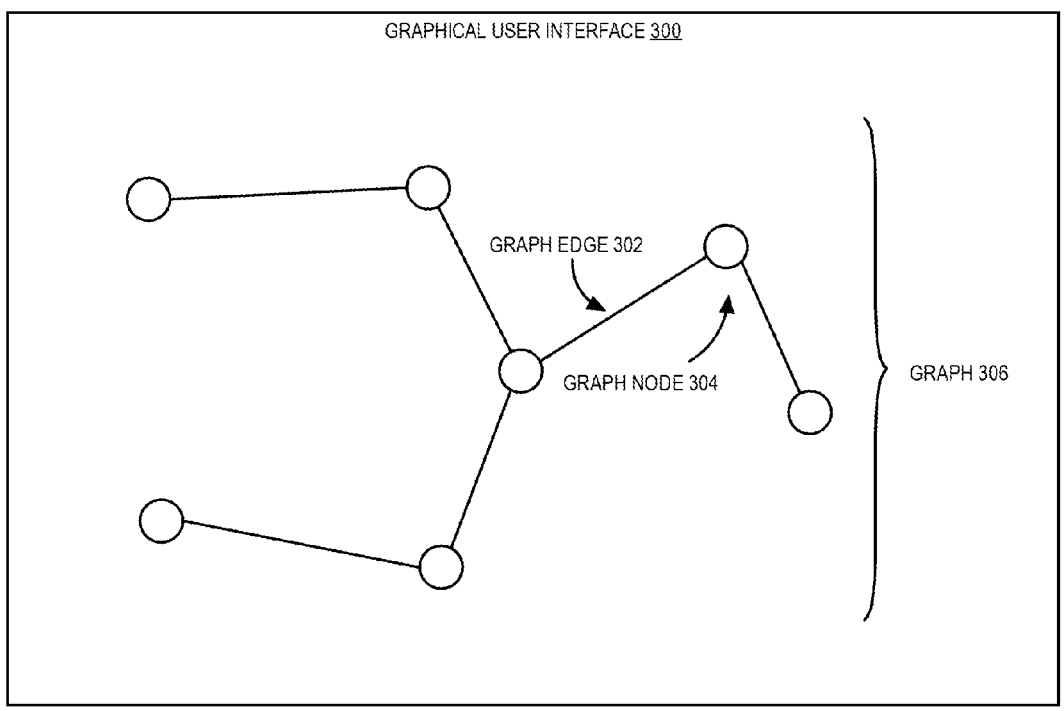
FIG. 3 depicts an example graph comprising graph nodes connected by graph edges.

FIG. 3 depicts an example graph comprising graph nodes connected by graph edges. In the example of FIG. 3, graphical user interface 300 comprises graph 306. Graph 306 comprises at least one graph node 304 and at least one graph edge 302.

Graphical user interface 300 may comprise a set of instructions in client computer 100 that allows the user to enter commands and/or interact with data. Graphical user interface 300 may display data from federated search computer 102 in a graphical format. Graphical user interface 300 may send data, such as one or more search queries, to federated search computer 102.

Graph edge 302 may represent a data object link that is described in at least one data ontology of the set of data ontologies. Graph edge 302 may connect a plurality of graph nodes. The user may specify a data object link for graph edge 302. For example, federated search computer 102 may provide graphical user interface 300 and/or client computer 100 with a set of available data object links from the plurality of heterogeneous data sources 104A-Z. The user may right-click graph edge 302, select from a list of available data object links, and enter a value in a text box. After the user specifies a data object link for a first graph edge, the set of available data object links may remain unchanged for a second graph edge. Additionally or alternatively, after the user specifies a data object link for graph edge 302, the set of available data object links may change in size.

Graph node 304 may represent a data object type and/or a data object property (e.g., value and/or type) that is/are described in at least one data ontology of the set of data ontologies. The user may specify a data object type and/or a data object property for graph node 304. For example, federated search computer 102 may provide graphical user interface 300 and/or client computer 100 with a set of available data object types and/or available data object properties from the plurality of heterogeneous data sources 104A-Z. The user may right-click graph node 304 and select from a list of available data object types and/or available data object properties.

After the user specifies a data object type and/or a data object property for a first graph node, the set of available data object types and/or available data object properties may remain unchanged for a second graph node. Additionally or alternatively, after the user specifies a data object type and/or a data object property for graph node 304, the set of available data object types and/or available data object properties may change in size.

For example, when the user specifies a value for graph node 304, a search query may be sent to federated search computer 102. The one or more results of the search query may increase the number of elements in the set of available data object links and/or the set of available data object types and/or available data object properties. In another example, the one or more results of the search query may be grouped based on one or more similarities (e.g., according to one or more resolution rules, such as the one or more resolution rules used to perform internal resolution, enrichment, and/or global resolution). Consequently, the set of available data object links and/or the set of available data object types and/or available data object properties may increase in size.

Graph 306 may represent one or more search queries across the plurality of heterogeneous data sources 104A-Z. For example, a pair of connected graph nodes may represent a single search query, and multiple pairs of connected graph nodes may represent successive search queries. Additionally or alternatively, graph 306 in its entirety may represent a single search query. Graph 306 may be transformed into a non-graphical representation of the one or more search queries. Graphical user interface 300, federated search computer 102, client interface logic 200, and/or one or more translation logics of the plurality of translation logics 202A-Z may transform graph 306 into one or more non-graphical search queries, such as SQL queries. Transforming graph 306 into the non-graphical representation of the one or more search queries may comprise transforming graph 306 into a serializable hierarchy of elements that correspond to the plurality of graph nodes and one or more graph edges. For example, graph 306 may be transformed into Extensible Markup Language (XML) or JavaScript Object Notation (JSON).

One or more results of the one or more search queries may be displayed to the user in a graphical format. Prior to sending the one or more results of the one or more search queries to client computer 100, federated search computer 102 may group the one or more results of the one or more search queries based on one or more similarities. Graphical user interface 300, federated search computer 102, client interface logic 200, and/or one or more translation logics of the plurality of translation logics 202A-Z may generate and/or display a graphical representation of the one or more results of the one or more search queries. Graph 306 may be transformed to display the one or more results of the one or more search queries.

Figure 4:
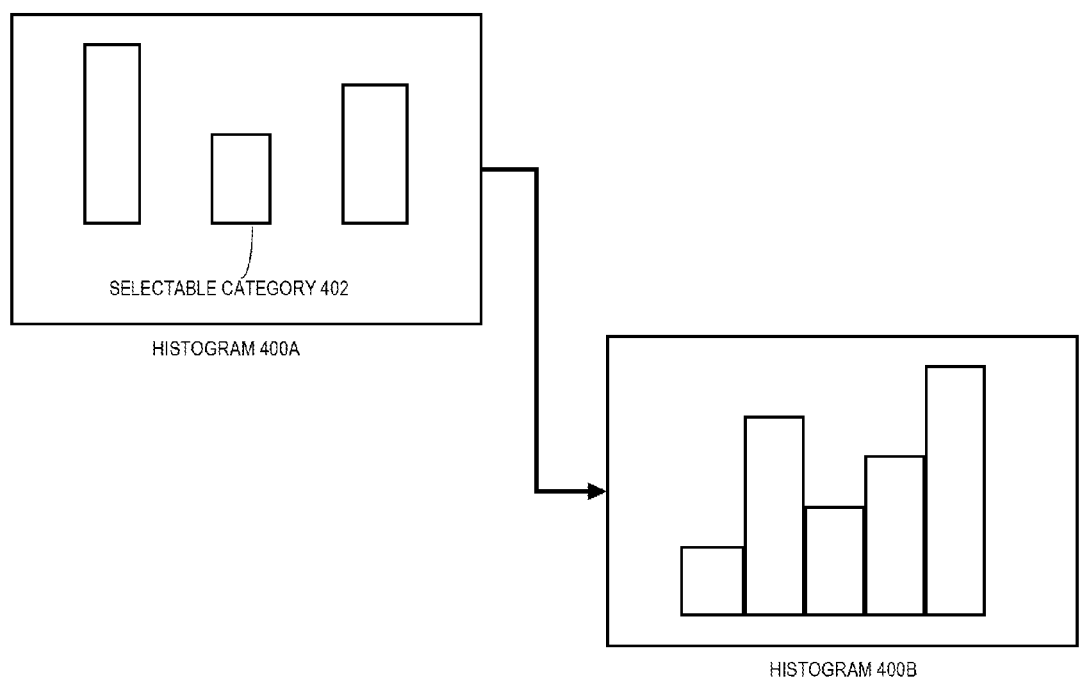
FIG. 4 depicts an example aggregated workflow.

FIG. 4 depicts an example aggregated workflow. In the example of FIG. 4, histogram 400A comprises selectable category 402. Histogram 400A leads to histogram 400B.

Histogram 400A, 400B may represent the set of available data object types and/or available data object properties. Federated search computer 102 may obtain the set of data ontologies associated with one or more data sources of the plurality of heterogeneous data sources 104A-Z. Graphical user interface 300, federated search computer 102, and/or client interface logic 200 may aggregate the set of available data object types and/or available data object properties. Graphical user interface 300, federated search computer 102, and/or client interface logic 200 may generate a graphical representation of the set of available data object types and/or available data object properties. The graphical representation of the set of available data object types and/or available data object properties may comprise histogram 400A, 400B. Histogram 400A, 400B may indicate the number of each of the available data object types and/or the number of each of the available data object properties displayed in histogram 400A, 400B.

Selectable category 402 may correspond to an available data object type and/or an available data object property in histogram 400A, 400B. When the user chooses selectable category 402, histogram 400B may be displayed. Histogram 400B may be identical to histogram 400A. Histogram 400B may differ from histogram 400A. Histogram 400B may differ from histogram 400A in that selectable categories associated with histogram 400B are more specific than selectable categories associated with histogram 400A. Additionally or alternatively, histogram 400B may differ from histogram 400A in the number of selectable categories and/or the number of elements in one or more selectable categories.

Choosing a selectable category 402 may be analogous to selecting a graph edge 302 and a graph node 304. For example, a pair of histograms may represent a single search query, and multiple pairs of histograms may represent successive search queries. Additionally or alternatively, an entire series of histograms may represent a single search query. Thus, a plurality of histograms may represent one or more search queries across the plurality of heterogeneous data sources 104A-Z.

The plurality of histograms may be transformed into a non-graphical representation of the one or more search queries. Graphical user interface 300, federated search computer 102, client interface logic 200, and/or one or more translation logics of the plurality of translation logics 202A-Z may transform the plurality of histograms into one or more non-graphical search queries. Transforming the plurality of histograms into the non-graphical representation of the one or more search queries may comprise transforming the plurality of histograms into a serializable hierarchy of elements.

4.1 Example Process

Figure 6:
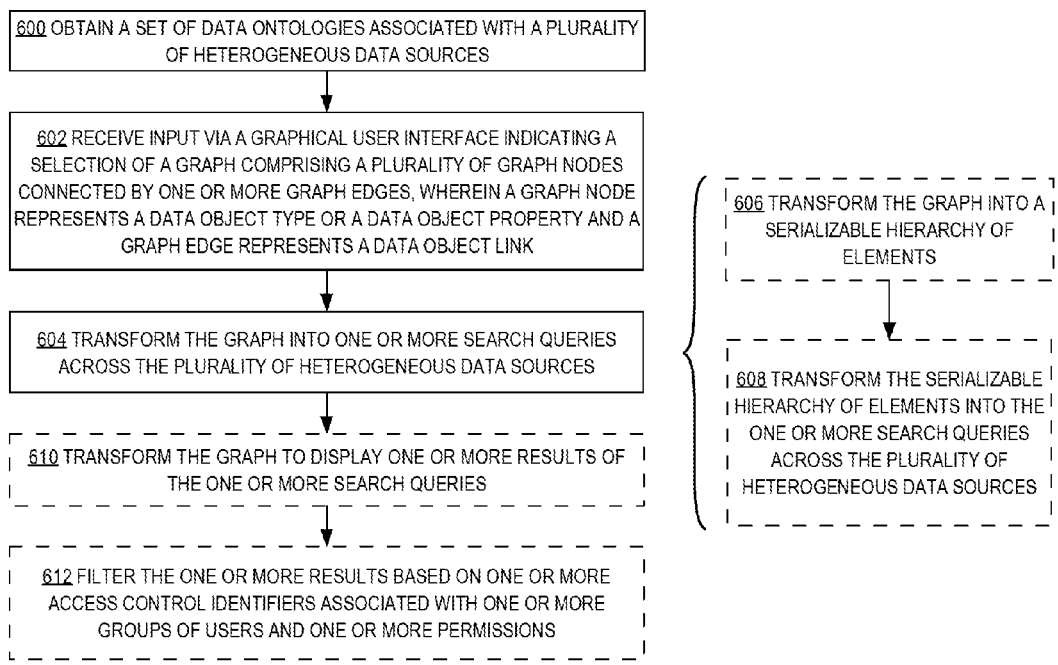
FIG. 6 is a flow diagram that depicts an approach for executing a visual search query across heterogeneous data sources.

FIG. 6 is a flow diagram that depicts an approach for executing a visual search query across heterogeneous data sources. In step 600, a set of data ontologies associated with a plurality of heterogeneous data sources is obtained. For example, federated search computer 102, client computer 100, and/or graphical user interface 300 may obtain the set of data ontologies from one or more data sources of the plurality of heterogeneous data sources 104A-Z and/or one or more translation logics of the plurality of translation logics 202A-Z.

In step 602, input via a graphical user interface indicating a selection of a graph comprising a plurality of graph nodes connected by one or more graph edges is received, wherein a graph node represents a data object type or a data object property and a graph edge represents a data object link. For example, graphical user interface 300 may receive input indicating the selection of the graph. The user may interact with graphical user interface 300 to select graph 306.

In step 604, the graph is transformed into one or more search queries across the plurality of heterogeneous data sources. For example, graphical user interface 300 may transform graph 306 into the one or more search queries. Graph 306 may comprise a "person" data object type and a "555-5555" phone number data object property connected by an "owner of" data object link. Graph 306 may be transformed into "SELECT name FROM table WHERE phone_number='555-5555'".

In optional step 606, the graph is transformed into a serializable hierarchy of elements. The elements may correspond to the plurality of graph nodes and the one or more graph edges. For example, graphical user interface 300 may transform graph 306 into the serializable hierarchy of elements. The code excerpt listed below and denoted Query Template is an example of a serializable hierarchy of elements.

Query Template:

```
line 1:     <template>
line 2:       <stage>
line 3:         <search>
line 4:           <initial-object-criteria>
line 5:             <object-type-uri include-child-types="true">
line 6:               com.palantir.object.Person
line 7:             </object-type-uri>
line 8:           </initial-object-criteria>
line 9:           <link-match-criteria>
line 10:            <link-type-uri>
line 11:              com.palantir.link.OwnerOf
line 12:            </link-type-uri>
line 13:          </link-match-criteria>
line 14:          <target-object-criteria>
line 15:            <object-type-uri include-child-types="true">
line 16:              com.palantir.object.Phone
line 17:            </object-type-uri>
line 18:          </target-object-criteria>
line 19:        </search>
line 20:      </stage>
line 21:   </template>
```

Query Template introduces a procedural aspect to an XML format. Lines 6 and 16 correspond to the plurality of graph nodes. Line 11 corresponds to graph edge 302.

In optional step 608, the serializable hierarchy of elements is transformed into the one or more search queries across the plurality of heterogeneous data sources. For example, Query Template may be transformed into "db.user.find({"object": person, "link": OwnerOf, "object": "phone"})".

In optional step 610, the graph is transformed to display one or more results of the one or more search queries. For example, federated search computer 102 and/or one or more translation logics of the plurality of translation logics 202A-Z may generate a graphical representation of the one or more results of the one or more search queries. Graphical user interface 300 may display the graphical representation of the one or more results of the one or more search queries to the user. Graphical user interface 300 may delete all or part of graph 306 prior to displaying the graphical representation of the one or more results of the one or more search queries. Additionally or alternatively, graphical user interface 300 may edit all or part of graph 306. For example, Alice, Bob, and Charlie may be persons who share the same house phone. Thus, graph 306 may be transformed in a manner such that graph 306 now comprises three graph nodes that are labeled "Alice", "Bob", and "Charlie" linked to the same Phone data object.

In optional step 612, the one or more results is/are filtered based on one or more access control identifiers associated with one or more groups of users and one or more permissions. One or more translation logics of the plurality of translation logics 202A-Z may assign a set of access control identifiers to a provenance identifier or any other unique identifier stored on a search result. For example, the set of access control identifiers may comprise a list of tuples, each of which associates a group of users to one or more permissions, such as "own", "write", "read", and/or "discovery". The group of users may identify one or more users and/or one or more client computers based on a user pseudonym, such as a hardware address, a registered username, a cookie, a geolocation, a software identifier, and/or an Internet Protocol (IP) address.

The set of access control identifiers may be associated with one or more data object properties. For example, a search query may return a data object with a gender value of "female" and a Social Security Number (SSN) of "555-55-5555". The set of access control identifiers may provide a user group representing everyone with read permission for the gender value. However, the set of access control identifiers may provide a user group representing law enforcement officers with read permission for the SSN.

Federated search computer 102 may optionally associate the set of access control identifiers with a set of coded identifiers comprising a character or a string of characters. For example, an access control identifier that provides everyone with read and write permission may be associated with a coded identifier of "5$A". Federated search computer 102 and/or client interface logic 200 may filter the one or more results based on the set of access control identifiers and/or the set of coded identifiers. Additionally or alternatively, federated search computer 102 and/or client interface logic 200 may filter the one or more results based on additional logic applied to the set of access control identifiers and/or the set of coded identifiers.

5.0 RESOLUTION RULES

FIG. 5 is a table that depicts an approach for resolving data objects and deduplicating data associated with the data objects. In the example of FIG. 5, table 500 has rows representing first data object 510, another data object 512, and match 514. Table 500 also has columns representing resolution rules 502, associated data 516, and deduplicated data 518. Resolution rules 502 includes columns representing data source unique identifier 504, repository unique identifier 506, and unique data object property type 508.

Resolution rules 502 may be the criteria used to group one or more results of one or more search queries. Resolution rules 502 may describe similarities used to group the one or more results of the one or more search queries. Resolution rules 502 may be used to perform the grouping described herein in Section 2.4, Section 2.5, Section 2.6, and/or Section 2.7. Additionally or alternatively, resolution rules 502 may be used to perform grouping between successive pluralities of graph nodes and/or histograms.

Data source unique identifier 504 may be all or part of a provenance identifier. Data source unique identifier 504 may correspond to a unique identifier, such as an index number, used by one or more data sources of the plurality of heterogeneous data sources 104A-Z to reference data stored in the one or more data sources of the plurality of heterogeneous data sources 104A-Z. Resolution rules 502 may group the one or more results of the one or more search queries based on matching data source unique identifiers.

Repository unique identifier 506 may correspond to a unique identifier used by repository system 110 to reference data stored in repository 114. The unique identifier may be a hashed value comprising one or more unique data object properties associated with a data object. Resolution rules 502 may group the one or more results of the one or more search queries based on matching repository unique identifiers.

Unique data object property type 508 may correspond to a data object property type that uniquely identifies an object type. For example, the data object property type of "SSN" uniquely identifies the object type of "people". Resolution rules 502 may group the one or more results of the one or more search queries based on matching unique data object property types.

First data object 510 may be a particular data object that results from a particular search query and/or a particular grouping based on one or more similarities. First data object 510 may be the repository data object, the first data object, the second data object, the third data object, the first union of matching results, the second union of matching results, and/or the third union of matching results. First data object 510 may also be the result of the grouping described herein in Section 2.4. Additionally or alternatively, first data object 510 may be one or more results of a search query comprising a plurality of graph nodes and/or histograms.

Another data object 512 may also be a particular data object that results from a particular search query and/or a particular grouping based on one or more similarities. Another data object 512 may be the repository data object, the first data object, the second data object, the third data object, the first union of matching results, the second union of matching results, and/or the third union of matching results. Another data object 512 may also be the result of the grouping described herein in Section 2.4. Additionally or alternatively, another data object 512 may be one or more results of a search query comprising a plurality of graph nodes and/or histograms.

Match 514 may represent a determination of whether first data object 510 and another data object 512 represent similar objects and/or the same object. Resolution rules 502 may be applied in any order and in any combination. For example, if match 514 is determined based on a first resolution rule, a second resolution rule may remain unapplied. Alternatively, the second resolution rules may be applied regardless of whether match 514 is determined based on the first resolution rule.

Associated data 516 may represent information associated with a particular data object. Associated data 516 may comprise one or more data object properties that result from a particular search query and/or a particular grouping based on one or more similarities. For example, the first union of matching results may result from performing a union operation on associated data 516 of the first data object with associated data 516 of the second data object.

Deduplicated data 518 may represent information that is ultimately stored in repository 114. In table 500, another data object 512 represents a repository data object. Applying resolution rules 502 to first data object 510 and a repository data object may subsequently involve deduplicating associated data 516 of first data object 510 and associated data 516 of the repository data object. Deduplication may involve removing information that appears more than once. In table 500, performing a union operation on associated data 516 of first data object 510 and associated data 516 of another data object 512 results in the same SSN appearing twice. After deduplication, the SSN appears once in deduplicated data 518.

6.0 PERSISTING FEDERATED SEARCH RESULTS

Figure 7:
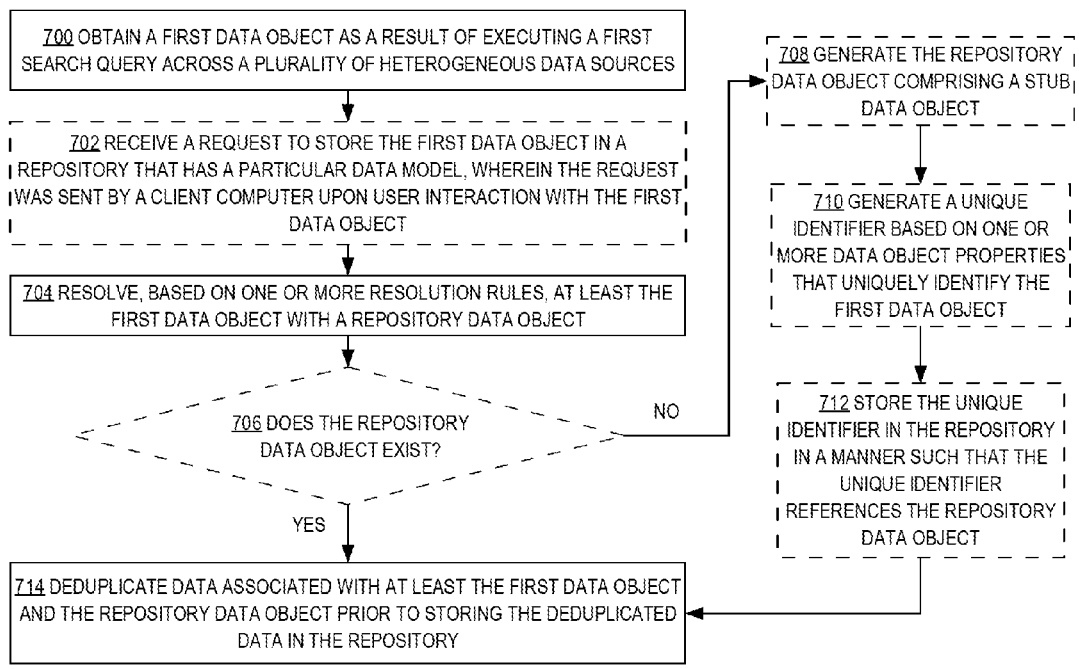
FIG. 7 is a flow diagram that depicts an approach for persisting federated search results.

FIG. 7 is a flow diagram that depicts an approach for persisting federated search results. In step 700, a first data object is obtained from a first search query across a plurality of heterogeneous data sources. Federated search computer 102 and/or the plurality of translation logics 202A-Z may process the first search query from client computer 100 and/or execute the first search query across the plurality of heterogeneous data sources 104A-Z. Federated search computer 102 and/or one or more translation logics of the plurality of translation logics 202A-Z may obtain the first data object from one or more data sources of the plurality of heterogeneous data sources 104A-Z.

In optional step 702, a request is received to store the first data object in a repository that has a particular data model, wherein the request was sent by a client computer upon user interaction with the first data object. Federated search computer 102 may send the one or more results of the first search query to client computer 100. Client computer 100 may send the persist request to federated search computer 102 when the user interacts with the one or more results of the first search query. For example, federated search computer 102 may process the persist request when the user clicks on the first data object.

In step 704, at least the first data object is resolved, based on one or more resolution rules, with a repository data object. Federated search computer 102, repository system 110, and/or repository interface computer 112 may resolve the first data object, the second data object, the third data object, the first union of matching results, the second union of matching results, and/or the third union of matching results with the repository data object. For example, federated search computer 102 may obtain the repository data object from repository system 110 and resolve at least the first data object with the repository data object.

In optional step 706, a determination is made regarding the existence of the repository data object. Federated search computer 102, repository system 110, and/or repository interface computer 112 may query repository 114 and/or repository cache 116 for the repository data object. A determination that the repository data object exists may lead directly to step 714. A determination that the repository data object does not exist may lead to step 708.

In optional step 708, the repository data object comprising a stub data object is generated. Federated search computer 102, repository system 110, and/or repository interface computer 112 may generate the repository data object. For example, federated search computer 102 may generate the stub data object. The stub data object may consist of repository unique identifier 506.

In optional step 710, a unique identifier is generated based on one or more data object properties that uniquely identify the first data object. The unique identifier may be repository unique identifier 506. Federated search computer 102, repository system 110, and/or repository interface computer 112 may generate the unique identifier. Step 710 may be performed prior to, simultaneously with, and/or subsequent to step 708.

In optional step 712, the unique identifier is stored in the repository in a manner such that the unique identifier references the repository data object. Federated search computer 102, repository system 110, and/or repository interface computer 112 may store the unique identifier and/or the repository data object in repository 114. The unique identifier may serve as a unique key and/or an index value for the repository data object.

In step 714, data associated with at least the first data object and the repository data object is deduplicated prior to being stored as deduplicated data in the repository. Federated search computer 102, repository system 110, and/or repository interface computer 112 may deduplicate associated data 516 of first data object 510 and associated data 516 of the repository data object and/or store deduplicated data 518 in repository 114. For example, federated search computer 102 may deduplicate the third union of matching results with data associated with the repository data object.

7.0 RESOLVING AND ENRICHING FEDERATED SEARCH RESULTS

Figure 8:
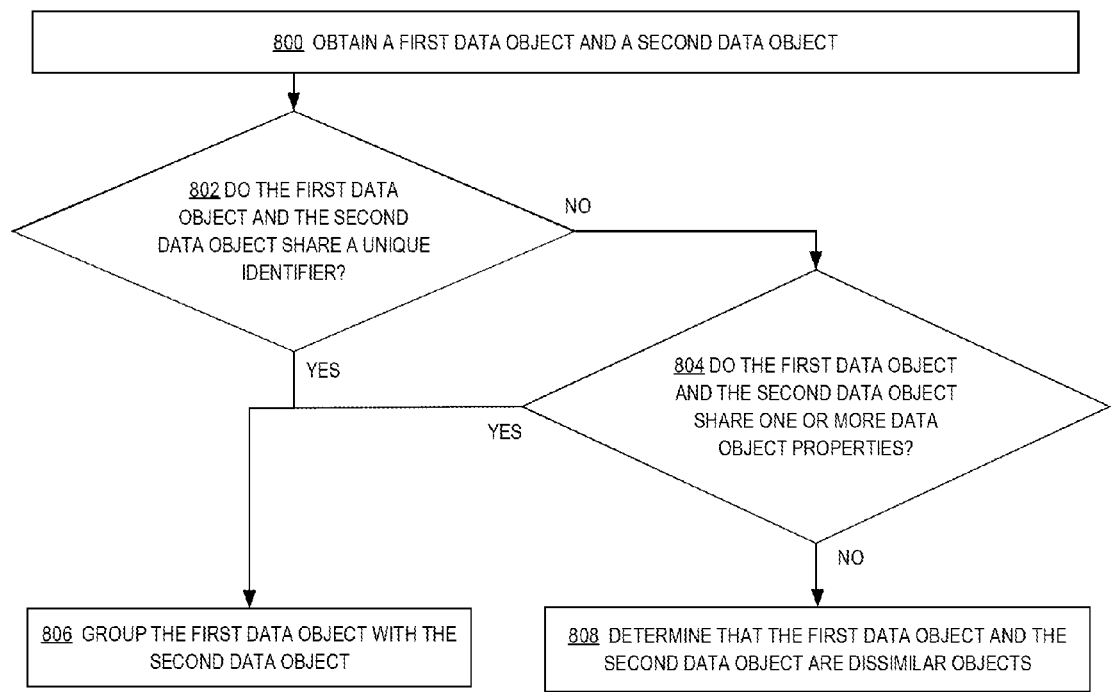
FIG. 8 is a flow diagram that depicts an approach for resolving data objects based on resolution rules.

FIG. 8 is a flow diagram that depicts an approach for resolving data objects based on resolution rules. In step 800, a first data object and a second data object are obtained. Federated search computer 102 and/or repository system 110 may obtain the first data object and the second data object from one or more data sources of the plurality of heterogeneous data sources 104A-Z and/or repository system 110.

In step 802, a determination is made as to whether the first data object and the second data object share a unique identifier. A determination that the first data object and the second data object share a unique identifier may lead directly to step 806. A determination that the first data object and the second data object have different unique identifiers may lead to step 804. The unique identifier(s) may reference the first data object and/or the second data object in the one or more data sources of the plurality of heterogeneous data sources 104A-Z and/or repository 114.

In step 804, a determination is made as to whether the first data object and the second data object share one or more data object properties. A determination that the first data object and the second data object share one or more data object properties may lead to step 806. A determination that the first data object and the second data object have different data object properties may lead to step 808. Step 804 may be performed prior to, simultaneously with, and/or subsequent to step 802.

In step 806, the first data object is grouped with the second data object. Federated search computer 102 and/or repository system 110 may determine that the first data object and the second data object are the same object and/or similar objects based on one or more resolution rules 502.

In step 808, the first data object and the second data object are determined to be dissimilar objects. Based on the one or more resolution rules 502, federated search computer 102 and/or repository system 110 may determine that the first data object and the second data object represent data objects with nothing in common.

Figure 9:
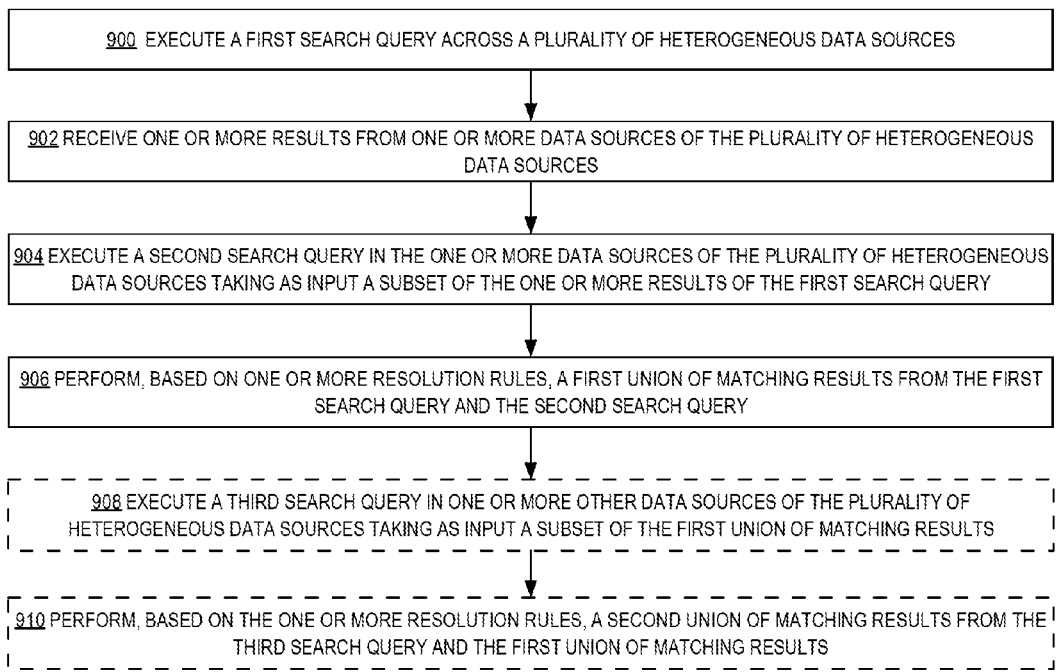
FIG. 9 is a flow diagram that depicts an approach for enriching federated search results.

FIG. 9 is a flow diagram that depicts an approach for enriching federated search results. In step 900, a first search query is executed across a plurality of heterogeneous data sources. For example, federated search computer 102 may search in the California Department of Motor Vehicles (DMV) database and in the California criminal records database for people living in Palo Alto who have been in fifteen or more car accidents.

In step 902, one or more results is/are received from one or more data sources of the plurality of heterogeneous data sources. For example, the California DMV database may return the names, addresses, and car accident counts for the people living in Palo Alto who have been in fifteen or more car accidents.

In step 904, a second search query that takes as input a subset (e.g., some or all) of the one or more results of the first search query is executed in the one or more data sources of the plurality of heterogeneous data sources. For example, federated search computer 102 may search in the California DMV database for the SSNs associated with the names and addresses of the people returned by the first search query.

In step 906, a first union of matching results from the first search query and the second search query is performed based on one or more resolution rules. For example, federated search computer 102 may add the SSNs to the names, addresses, and car accident counts of the people returned by the first search query.

In optional step 908, a third search query that takes as input a subset (e.g., some or all) of the first union of matching results is executed in one or more other data sources of the plurality of heterogeneous data sources. For example, federated search computer 102 may search in the California criminal records database for felony convictions associated with the SSNs of the people returned by the first search query.

In optional step 910, a second union of matching results from the third search query and the first union of matching results is executed based on the one or more resolution rules. For example, federated search computer 102 may add the felony convictions to the names, addresses, car accident counts, and the SSNs of the people returned by the first search query.

8.0 SYNCHRONIZING CHANGES

Figure 10:
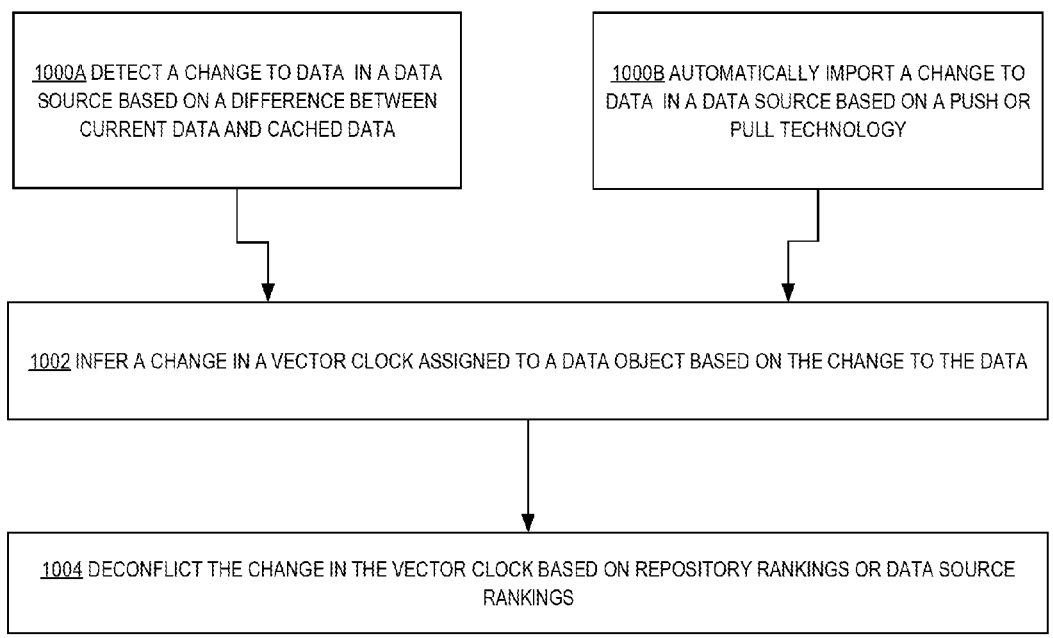
FIG. 10 is a flow diagram that depicts an approach for synchronizing changes to data.

FIG. 10 is a flow diagram that depicts an approach for synchronizing changes to data. In step 1000A, a change to data in a data source is detected based on a difference between current data and cached data. Federated search computer 102 may periodically re-execute a previously executed search query in one or more data sources of the plurality of heterogeneous data sources 104A-Z. Each time federated search computer 102 re-executes the previously executed search query, federated search computer 102 may also search one or more data source caches of the plurality of data source caches 106A-Z that correspond to the one or more data sources of the plurality of heterogeneous data sources 104A-Z. Federated search computer 102 may compare data returned from the one or more data sources of the plurality of heterogeneous data sources 104A-Z to data stored in the one or more data source caches of the plurality of data source caches 106A-Z and thereby detect the change to data in the one or more data sources of the plurality of heterogeneous data sources 104A-Z.

In step 1000B, a change to data in a data source is automatically imported based on a push or pull technology. Step 1000B may be an alternative to step 1000A. For example, whenever the change to data in the one or more data sources of the plurality of heterogeneous data sources 104A-Z occurs, federated search computer 102 may be configured to automatically receive a push notification containing the change and/or the location of the change.

In step 1002, a change in a vector clock assigned to a data object is inferred based on the change to the data. For example, federated search computer 102 may search in repository 114 and/or repository cache 116 for the repository data object associated with the change described in the push notification. Federated search computer 102 may search in the one or more data sources of the plurality of heterogeneous data sources 104A-Z described in the push notification for the data object associated with the change. A vector clock entry assigned to the repository data object may have a value of "1", whereas a vector clock entry assigned to a federated data object may have a value of "2".

In step 1004, the change in the vector clock is deconflicted based on repository rankings or data source rankings. For example, a data source ranking may indicate that the one or more data sources of the plurality of heterogeneous data sources 104A-Z associated with the data object is more authoritative than repository 114. Thus, federated search computer 102 may update the repository data object with the change to data in the data object. Alternatively, conflicting data may be presented in graphical user interface 300 to allow the user to deconflict manually.

9.0 EXAMPLE IMPLEMENTING MECHANISMS

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
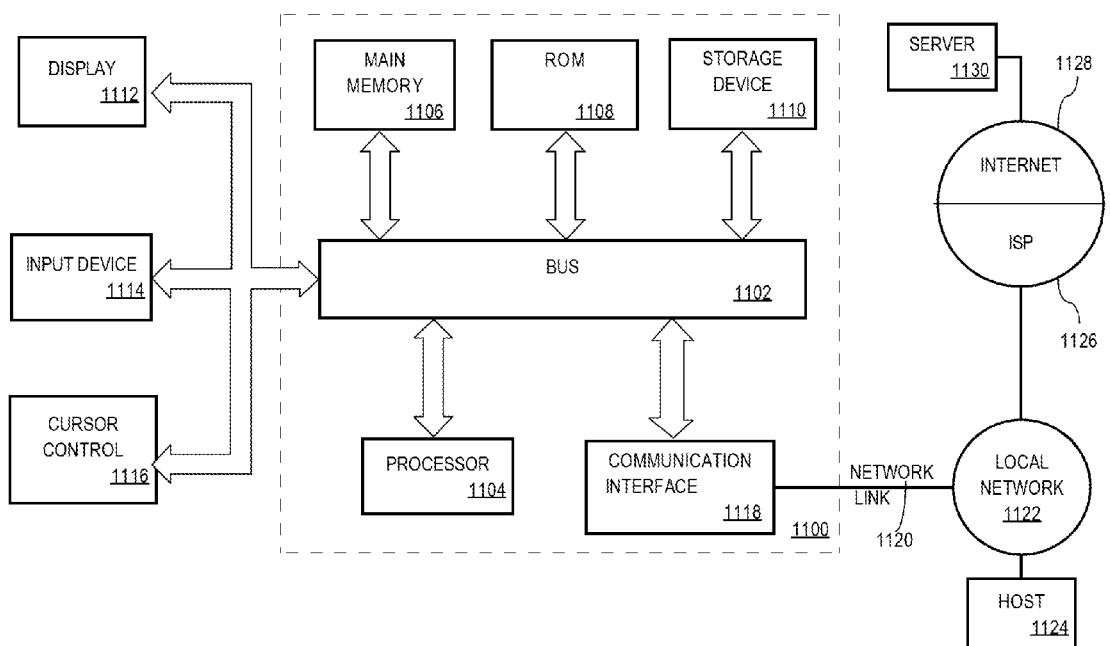
FIG. 11 depicts a computer system upon which an embodiment may be implemented.

For example, FIG. 11 is a block diagram that depicts a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
obtaining a first data object as a result of executing a first search query against a first data source of a plurality of heterogeneous data sources;
obtaining a second data object as a result of executing a second search query against a second data source, that is not the first data source, of the plurality of heterogeneous data sources;
determining, based on one or more resolution rules, whether the first data object and the second data object represent similar objects or identical objects;
in response to determining that the first data object and the second data object represent similar objects or identical objects:
generating an intermediate data object based on grouping the first data object with the second data object;
generating a unique identifier for the intermediate data object based on hashing one or more data object properties that uniquely identify the intermediate data object;
determining whether a repository data object that shares the unique identifier is stored in a repository that has a particular data model;
in response to determining that the repository data object is not stored in the repository, generating a stub data object that is referenced by the unique identifier and that is stored in the repository;
resolving the intermediate data object with the stub data object;
deduplicating data associated with the intermediate data object and the stub data object;
storing the deduplicated data in the repository that has the particular data model;
wherein the method is performed by one or more computing devices.

2. The method of claim 1, wherein the particular data model comprises an object-centric data model.

3. The method of claim 1, wherein the one or more data object properties comprise a provenance identifier.

4. The method of claim 1, wherein the second search query takes as input one or more results of the first search query.

5. The method of claim 1, wherein a change to data in one of the plurality of heterogeneous data sources and a change to data in the repository are synchronized based on vector clocks, repository rankings, or data source rankings.

6. A system comprising:
one or more processors; and
one or more non-transitory storage media storing instructions which, when executed by the one or more processors, cause:
obtaining a first data object as a result of executing a first search query against a first data source of a plurality of heterogeneous data sources;
obtaining a second data object as a result of executing a second search query against a second data source, that is not the first data source, of the plurality of heterogeneous data sources;
determining, based on one or more resolution rules, whether the first data object and the second data object represent similar objects or identical objects;
in response to determining that the first data object and the second data object represent similar objects or identical objects:
generating an intermediate data object based on grouping the first data object with the second data object;
generating a unique identifier for the intermediate data object based on hashing one or more data object properties that uniquely identify the intermediate data object;
determining whether a repository data object that shares the unique identifier is stored in a repository that has a particular data model;
in response to determining that the repository data object is not stored in the repository, generating a stub data object that is referenced by the unique identifier and that is stored in the repository;
resolving the intermediate data object with the stub data object;
deduplicating data associated with the intermediate data object and the stub data object;
storing the deduplicated data in the repository that has the particular data model.

7. The system of claim 6, wherein the particular data model comprises an object-centric data model.

8. The system of claim 6, wherein the one or more data object properties comprise a provenance identifier.

9. The system of claim 6, wherein the second search query takes as input one or more results of the first search query.

10. The system of claim 6, wherein a change to data in one of the plurality of heterogeneous data sources and a change to data in the repository are synchronized based on vector clocks, repository rankings, or data source rankings.

* * * * *